United States Patent [19]

Sugiyama et al.

[11] Patent Number: 5,280,537
[45] Date of Patent: Jan. 18, 1994

[54] DIGITAL COMMUNICATION SYSTEM USING SUPERPOSED TRANSMISSION OF HIGH SPEED AND LOW SPEED DIGITAL SIGNALS

[75] Inventors: Takatoshi Sugiyama; Shuji Kubota; Masahiro Morikura; Kiyoshi Enomoto; Shuzo Kato, all of Kanagawa, Japan

[73] Assignee: Nippon Telegraph and Telephone Corporation, Tokyo, Japan

[21] Appl. No.: 980,919

[22] Filed: Nov. 24, 1992

[30] Foreign Application Priority Data

Nov. 26, 1991 [JP] Japan .................. 3-310782

[51] Int. Cl.$^5$ ............. H04L 27/30; H04L 5/12; H04J 3/22
[52] U.S. Cl. .................... 375/1; 370/110.4; 370/21; 370/18
[58] Field of Search ......... 370/110.4, 37, 38, 18, 370/21; 375/1

[56] References Cited

U.S. PATENT DOCUMENTS

| | | | |
|---|---|---|---|
| Re. 32,905 | 4/1989 | Baran .................... | 375/1 X |
| 3,752,921 | 8/1973 | Audretsch, Jr. et al. ..... | 370/110.4 |
| 4,328,579 | 5/1982 | Hashimoto et al. ......... | 370/111 |
| 4,425,661 | 1/1984 | Moses et al. ............. | 375/1 |
| 4,495,620 | 1/1985 | Steele et al. ............ | 370/118 |
| 4,748,636 | 5/1988 | Kato ..................... | 375/1 |
| 4,761,796 | 8/1988 | Dunn et al. .............. | 375/1 |
| 4,899,350 | 2/1990 | Kage ..................... | 370/110.4 X |
| 4,905,221 | 2/1990 | Ichiyoshi ................ | 370/18 |
| 4,972,408 | 11/1990 | Le Bihan Herve et al. .... | 370/84 |
| 5,022,046 | 6/1991 | Morrow, Jr. .............. | 375/1 |
| 5,036,513 | 7/1991 | Greenblatt ............... | 370/110.4 X |

OTHER PUBLICATIONS

Authors: Kiyoshi Enomoto, Masahiro Morikura, Shuji Kubota & Shuzo Kato Title: Common Transmission Of High Speed QPSK Signals and SSMA Signals Over Nonlinearly Amplified Transponder Date: May 1991, pp. 1155-1161 Publication: IEICE Transactions, vol. E 74, No. 5.

Primary Examiner—Gilberto Barron, Jr.
Attorney, Agent, or Firm—Allegretti & Witcoff, Ltd.

[57] ABSTRACT

A digital communication system using superposed transmission of high and low speed digital signals capable of transmitting superposed high and low speed digital signals through an identical frequency band efficiently by increasing a simultaneously transmittable number of channels in the low speed digital signals, while achieving the practically reasonable bit error rate performances for both the high speed digital signals and the low speed digital signals. In this system, the low speed digital signals are transmitted in a form of spread spectrum signals and the high speed digital signals are cancelled out from the superposed transmission signals in obtaining the output low speed digital signals by using the phase inverted replica of the high speed digital signals to be combined with the superposed transmission signals, so that it becomes possible to increase a number of channels for the low speed digital signals, while achieving the practically reasonable bit error rate performances for both the high speed digital signals and the low speed digital signals.

27 Claims, 8 Drawing Sheets

DIGITAL COMMUNICATION SYSTEM USING SUPERPOSED TRANSMISSION OF HIGH SPEED AND LOW SPEED DIGITAL SIGNALS

BACKGROUND OF THE INVENTION

1. Field of the Invention

The present invention relates to a superposed digital signal transmission scheme for transmitting high speed digital signals and low speed digital signals used in a digital communication system.

2. Description of the Background Art

The currently adopted satellite video communication system uses a video signal transmission earth station capable of transmitting both video signals and voice signals and small earth stations capable of transmitting only voice signals, in which the transmission of the video signals is realized as a one-way transmission in an analog FM mode from the video signal transmission earth station, while the transmission of the answer-back voice signals from the small earth station which receives the video signals from the video signal transmission earth station is realized by using a terrestrial network.

However, such a current satellite video communication system has been associated with a problem concerning a limited flexibility available in setting up a new small earth station because of the use of the terrestrial network for the answer-back voice signal transmission.

In order to economize a practical implementation of such a satellite video communication system by improving the flexibility in setting up of a new small earth station, it has been considered desirable to realize a video communication system which fully uses digital satellite transmissions for all the signal transmissions involved.

Now, if such a video communication system using fully digital satellite transmissions is to be realized by utilizing the FDMA (Frequency Division Multiple Access) mode, it would become necessary to expand the available frequency band considerably in order to avoid the mutual interference among different channels, whereas if such a video communication system using fully digital satellite transmissions is to be realized by utilizing the TDMA (Time Division Multiple Access) mode, it would become necessary for each station to be provided with an expensive high power amplifier equipment such as TWTA (Travelling Wave Tube Amplifier), and this can lead to a very large-sized earth station.

SUMMARY OF THE INVENTION

It is therefore an object of the present invention to provide a digital communication system using superposed transmission of high and low speed digital signals capable of transmitting superposed high and low speed digital signals through an identical frequency band efficiently.

It is another object of the present invention to provide a digital communication system using superposed transmission of high and low speed digital signals capable of increasing a simultaneously transmittable number of channels in the low speed digital signals.

It is another object of the present invention to provide a digital communication system using superposed transmission of high and low speed digital signals capable of achieving the practically reasonable bit error rate performances for both the high speed digital signals and the low speed digital signals, even when a number of channels for the low speed digital signals is increased.

According to one aspect of the present invention there is provided a method of superposed transmission of high and low speed digital signals in a digital communication system, comprising the steps of: (a1) forward error correction encoding high speed digital signals to be transmitted to obtain encoded high speed digital signals; (a2) modulating a first carrier in a first frequency with the encoded high speed digital signals obtained at the step (a1) to obtain modulated high speed signals; (b1) forward error correction encoding low speed digital signals to be transmitted to obtain encoded low speed digital signals; (b2) spreading a spectrum of the encoded low speed digital signals obtained at the step (b1) to obtain spread spectrum signals; (b3) modulating a second carrier in a second frequency with the spread spectrum signals obtained at the step (b2) to obtain modulated spread spectrum signals; (c) transmitting the modulated high speed signals obtained at the step (a2) and the modulated spread spectrum signals obtained at the step (b3) through an identical frequency band on a transmission path in a form of superposed transmission signals; (d1) demodulating the modulated high speed signals in the superposed transmission signals transmitted through the transmission path at the step (c) to reproduce the encoded high speed digital signals; (d2) forward error correction decoding the encoded high speed digital signals reproduced at the step (d2) to reproduce the high speed digital signals; (e1) obtaining a phase inverted replica of the modulated high speed signals in the superposed transmission signals transmitted through the transmission path at the step (c) according to the high speed digital signals reproduced at the step (d2); (e2) power combining the superposed transmission signals transmitted through the transmission path at the step (c) with the phase inverted replica obtained at the step (e1) to obtain modulated spread spectrum signals in the superposed transmission signals; (f1) despreading a spectrum of the modulated spread spectrum signals obtained at the step (e2) to obtain modulated low speed signals; (f2) demodulating the modulated low speed signals obtained at the step (f1) to reproduce the encoded low speed digital signals; and (f3) forward error correction decoding the encoded low speed digital signals reproduced at the step (f2) to reproduce the low speed digital signals.

According to another aspect of the present invention there is provided a digital communication system using superposed transmission of high and low speed digital signals, comprising: receiver means for receiving modulated high speed signals and modulated spread spectrum signals through an identical frequency band on a transmission path in a form of superposed transmission signals; first demodulator means for demodulating the modulated high speed signals in the superposed transmission signals transmitted through the transmission path and received by the receiver means to obtain encoded high speed digital signals; first decoder means for forward error correction decoding the encoded high speed digital signals obtained by the first demodulator means to obtain high speed digital signals; replica generation means for obtaining a phase inverted replica of the modulated high speed signals in the superposed transmission signals transmitted through the transmission path and received by the receiver means according to the high speed digital signals obtained by the first decoder means; power combiner means for power combining the superposed transmission signals transmitted through the transmission path and received by the receiver means with the phase inverted replica obtained by the replica generation means to obtain modulated spread spectrum signals in the superposed transmission signals; spectrum despreader means for despreading a spectrum of the modulated spread spectrum signals obtained by the power combiner means to obtain modulated low speed signals; second demodulator means for demodulating the modulated low speed signals obtained by the spectrum despreader means to obtain encoded low speed digital signals; and second decoder means for forward error correction decoding the encoded low speed digital signals obtained by the second demodulator means to obtain low speed digital signals.

According to another aspect of the present invention there is provided an apparatus for superposed transmission of high and low speed digital signals, comprising: first encoder means for forward error correction encoding high speed digital signals to be transmitted to obtain encoded high speed digital signals; first modulator means for modulating a first carrier in a first frequency with the encoded high speed digital signals obtained by the first encoder means to obtain modulated high speed signals to be transmitted through a transmission path; second encoder means for forward error correction encoding low speed digital signals to be transmitted to obtain encoded low speed digital signals; spectrum spreader means for spreading a spectrum of the encoded low speed digital signals obtained by the second encoder means to obtain spread spectrum signals; second modulator means for modulating a second carrier in a second frequency with the spread spectrum signals obtained by the spectrum spreader means to obtain modulated spread spectrum signals to be transmitted through the transmission path; and transmitter means for transmitting the modulated high speed signals obtained by the first modulator means and the modulated spread spectrum signals obtained by the second modulator means through an identical frequency band on the transmission path in a form of superposed transmission signals.

Other features and advantages of the present invention will become apparent from the following description taken in conjunction with the accompanying drawings.

DETAILED DESCRIPTION OF THE PREFERRED EMBODIMENTS

Figure 1:
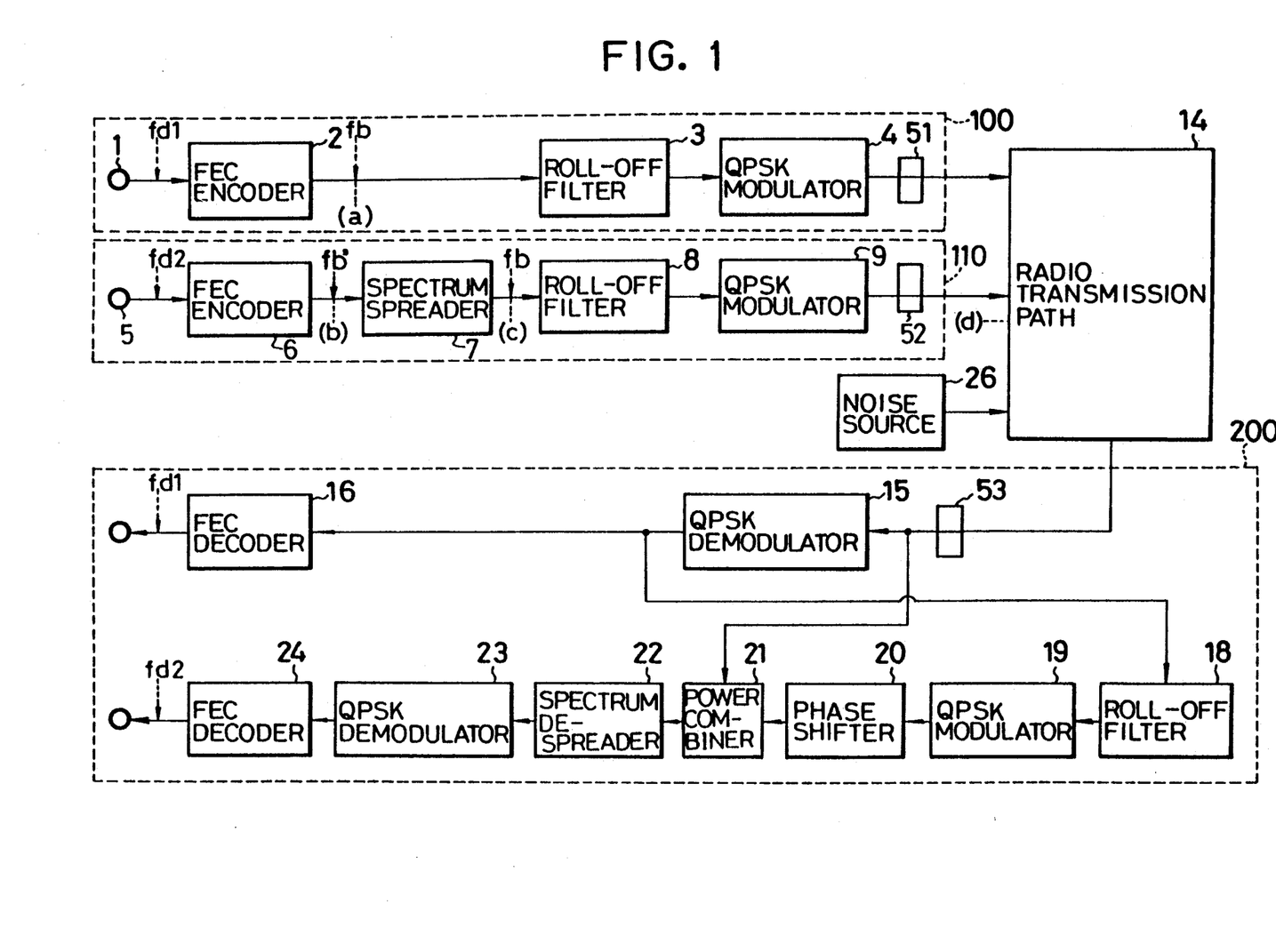
FIG. 1 is a block diagram of one embodiment of a digital communication system according to the present invention.

Referring now to FIG. 1, one embodiment of a digital communication system using superposed transmission of high speed and low speed digital signals according to the present invention will be described in detail.

In this digital communication system, at a high speed signal transmitting station 100, input high speed digital signals to be transmitted are entered from an input terminal 1 at a speed of fd1 (bit/sec).

The entered high speed digital signals are then supplied to an FEC (Forward Error Correction) encoder 2 for applying a convolutional encoding with an encoding rate of $(n-1)/n$, where n is a natural number. The encoded high speed digital signals are then applied with a serial-parallel conversion, and obtained I (In-phase) and Q (Quadrature) signals are then supplied at a speed of $fb=n/2(n-1)fd1$ (bit/sec) to a roll-off filter 3 for applying a waveform shaping with a roll-off rate $\alpha$ ($0<\alpha<1$).

Figure 2A:
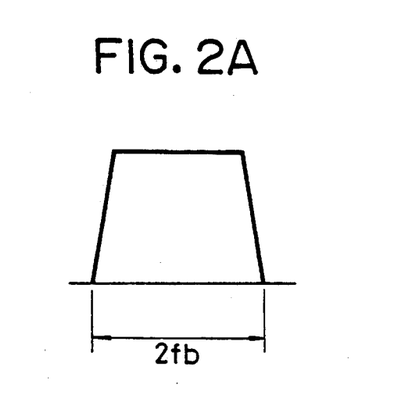
FIGS. 2A, 2B, 2C, and 2D show power spectra at points (a), (b), (c), and (d) indicated in FIG. 1, respectively, in the digital communication system of FIG. 1.

At this point, at a point (a) indicated in FIG. 1, the high speed digital signals have a power spectrum as shown in FIG. 2A, with a frequency band equivalent to $2fb$.

A waveform shaped output of the roll-off filter 3 is then supplied to a QPSK (Quadrature Phase Shift Keying) modulator 4 to make a quadrature modulation of a carrier in a frequency fc1 to obtain high speed QPSK signals.

On the other hand, at a low speed signal transmitting station 110, input high speed input low speed digital signals to be transmitted are entered from an input terminal 5 at a speed of fd2 (bit/sec), where fd2<fd1.

The entered low speed digital signals are then supplied to an FEC encoder 6 for applying a convolutional encoding with an encoding rate of $(n'-1)/n'$, where n' is a natural number. The encoded low speed digital signals are then applied with serial-parallel conversion, and obtained I (In-phase) and Q (Quadrature) signals are then supplied to a spectrum spreader 7 at a speed of $fb'=n'/2(n'-1)fd2$ (bit/sec).

Figure 2B:
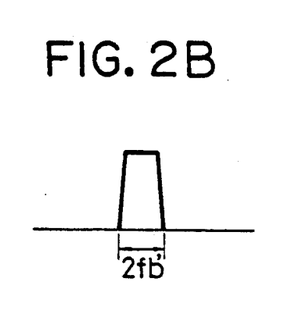

At this point, at a point (b) indicated in FIG. 1, the low speed digital signals have a power spectrum as shown in FIG. 2B, with a frequency band equivalent to $2fb'$.

Figure 3:
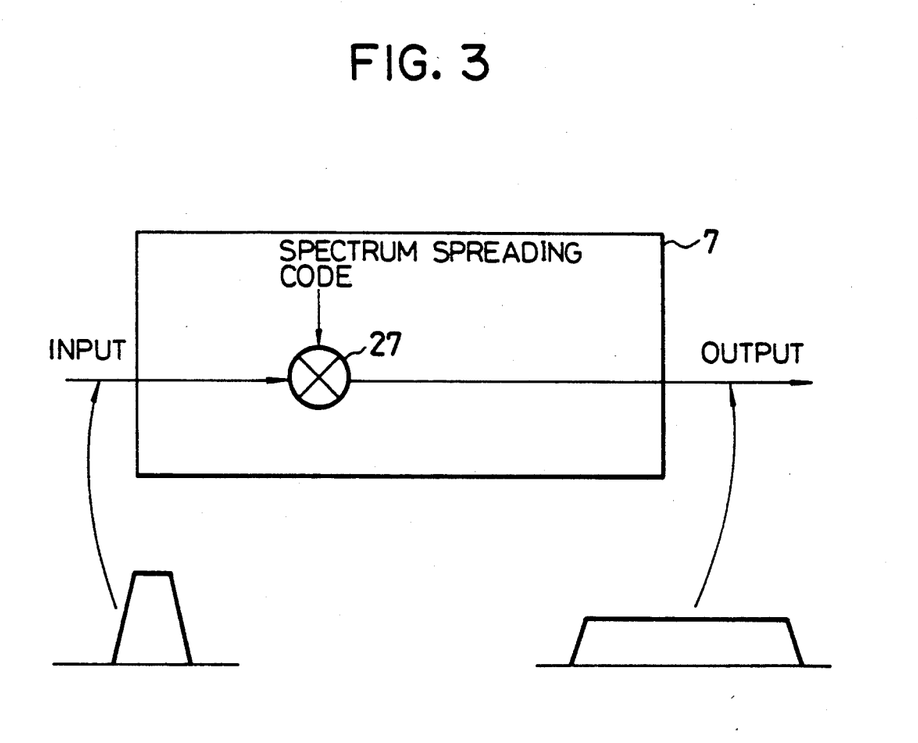
FIG. 3 is schematic block diagram of a spectrum spreader of a direct sequence type used in the digital communication system of FIG. 1.

At the spectrum spreader 7, the spectrum of the I and Q signals supplied from the FEC encoder 6 are spread to obtain SSMA (Spread Spectrum Multiple Access) signals. In this embodiment, as shown in FIG. 3, the spectrum spreader 7 is of a direct sequence type in which an output is obtained by multiplying an input directly with spectrum spreading codes at a multiplier 27.

Figure 2C:
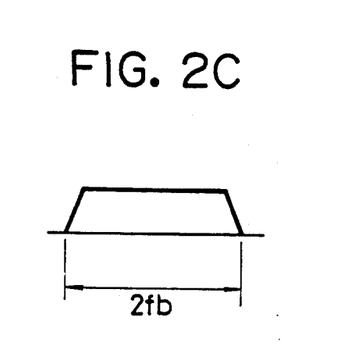

The obtained SSMA signals are then supplied at a speed of fb to a roll-off filter 8 for applying a waveform shaping with a roll-off rate $\alpha$. At this point, at a point (c)

indicated in FIG. 1, the SSMA signals have a power spectrum as shown in FIG. 2C, with a frequency band equivalent to $2fb$.

A waveform shaped output of the roll-off filter 8 is then supplied to a QPSK modulator 9 to make a quadrature modulation of a carrier in a frequency fc2 to obtain SSMA-QPSK signals.

The high speed QPSK signals and the SSMA-QPSK signals obtained by the QPSK modulators 4 and 9 are then transmitted from a high speed signal transmitter device 51 provided at the high speed signal transmitter station 100 and a low speed signal transmitter device 52 provided at the low speed signal transmitter station 110, respectively, through a radio transmission path 14 by using an identical frequency band, such that the high speed and the low speed digital signals are superposed on the radio transmission path 14.

Figure 2D:
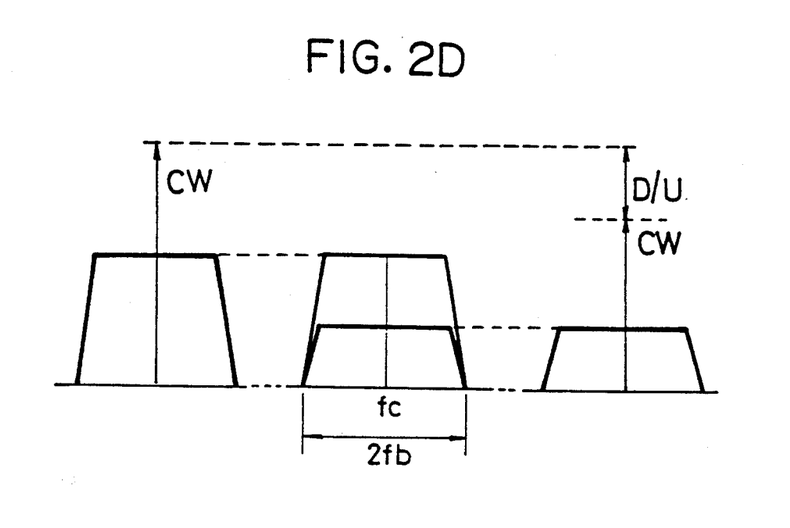

At this point, at a point (d) indicated in FIG. 1, the superposed high speed and low speed digital signals have power spectra as shown in FIG. 2D, with a frequency band equivalent to $2fb$ and a common central frequency fc. Here, the superposed high speed and low speed digital signals at the radio transmission path 14 have the continuous wave (CW) power ratio of the high speed signals to the SSMA signals indicated as D/U (Desired to Undesired signal power ratio) in FIG. 2D.

At a receiving station 200, the superposed high speed QPSK and SSMA-QPSK signals received from the radio transmission path 14 by a receiver station receiver device 53 are entered into a QPSK demodulator 15 for demodulating the received superposed signals.

Then, on one hand, the demodulated output signals of the QPSK demodulator 15 are supplied to an FEC decoder 16 for making the error correction on the demodulated output signals, which is a Viterbi decoder capable of decoding the high speed digital signals encoded by the FEC encoder 2, such that output high speed digital signals reproducing the input high speed digital signals are obtained at an output terminal 17, at a speed of fd1 which is the same as the speed of the input high speed digital signals.

On the other hand, the demodulated output signals of the QPSK demodulator 15 are also supplied to a roll-off filter 18 for applying a waveform shaping with a roll-off rate α, and a waveform shaped output of the roll-off filter 18 is then supplied to a QPSK modulator 19 to make a quadrature modulation of a carrier in a frequency fc2, so as to obtain a replica of the high speed QPSK signals in the same amplitude as the high speed QPSK signals.

Then, the obtained replica of the high speed QPSK signals is supplied to a phase shifter 20 for inverting a phase of this replica, and the phase inverted replica is supplied to a power combiner 21. The power combiner 21 is also supplied with the superposed high speed QPSK and SSMA-QPSK signals received from the radio transmission path 14, such that the power combiner 21 combines the received superposed signals with the phase inverted replica, so as to cancel the high speed digital signals in the received superposed signals and extract the SSMA-QPSK signals in the received superposed signals.

The SSMA-QPSK signals obtained by the power combiner 21 are then supplied to a spectrum despreader 22 for despreading the spectrum of the SSMA-QPSK signals. This spectrum despreader 22 carries out an inverse operation of the spectrum spreading operation made by the spectrum spreader 7. Then, the spectrum despread output signals obtained by the spectrum despreader 22 are supplied to a QPSK demodulator 23 for demodulating the spectrum despread output signals.

Finally, the demodulated output signals of the QPSK demodulator 23 are supplied to an FEC decoder 24 for making the error correction on the demodulated output signals, which is a Viterbi decoder capable of decoding the low speed digital signals encoded by the FEC encoder 6, such that output low speed digital signals reproducing the input low speed digital signals are obtained at an output terminal 25, at a speed of fd2 which is the same as the speed of the input low speed digital signals.

FIG. 1 also shows a noise source 26 for power combining a variable amount of noise to the radio transmission path 14, which was used in the experiment to be described below for the purpose of realizing the realistic transmission condition.

Thus, in this digital communication system, the low speed digital signals are transmitted by using the FEC and the SSMA mode through the identical frequency band as the high speed digital signals. Consequently, the transmission of the superposed high speed and low speed digital signals can be realized by using a single transponder, and the transmission of the SSMA signals can be made by using a low power SSPA (Solid State Power Amplifier) having a transmission power of less than 1 watt.

In addition, the high speed digital signals which can potentially interfere with the SSMA signals are cancelled out in obtaining the output low speed digital signals by using the replica of the high speed digital signals. As a consequence, it becomes possible to increase a number of channels for the low speed digital signals, as will be fully explained below.

Furthermore, in this digital communication system, it is possible to realize the transmission of the high speed digital signals and the low speed digital signals at the appropriate bit error rates for respective signals, even when a number of channels for the low speed digital signals is increased, as will also be fully explained below.

Here, it is to be noted that the FEC encoders 2 and 6 may use any FEC encoding other than the convolutional encoding used in this embodiment, such as those using the Reed-Solomon codes, BCH codes, etc., and the FEC decoders 16 and 24 mat use any FEC decoding other than the Viterbi decoding used in this embodiment.

It is also to be noted that the roll-off filters 3, 8, and 18 used in this embodiment may be replaced by other types of waveform shaping circuit.

It is also to be noted that the QPSK modulation used in this embodiment may be replaced by BPSK (Binary Phase Shift Keying) modulation.

It is also to be noted that the spectrum spreader 7 and the spectrum despreader 22 may use the spectrum spreading other than the direct sequence type used in this embodiment, such as a frequency hopping type.

It is also to be noted that the reception of the superposed high speed and low speed digital signals from the radio transmission path 14 can be made by using any desired detection mode including a coherent detection and a differential detection.

It is also to be noted that the radio transmission path 14 may be replaced by other types of transmission path such as an optical fiber transmission path, if desired.

Figure 4:
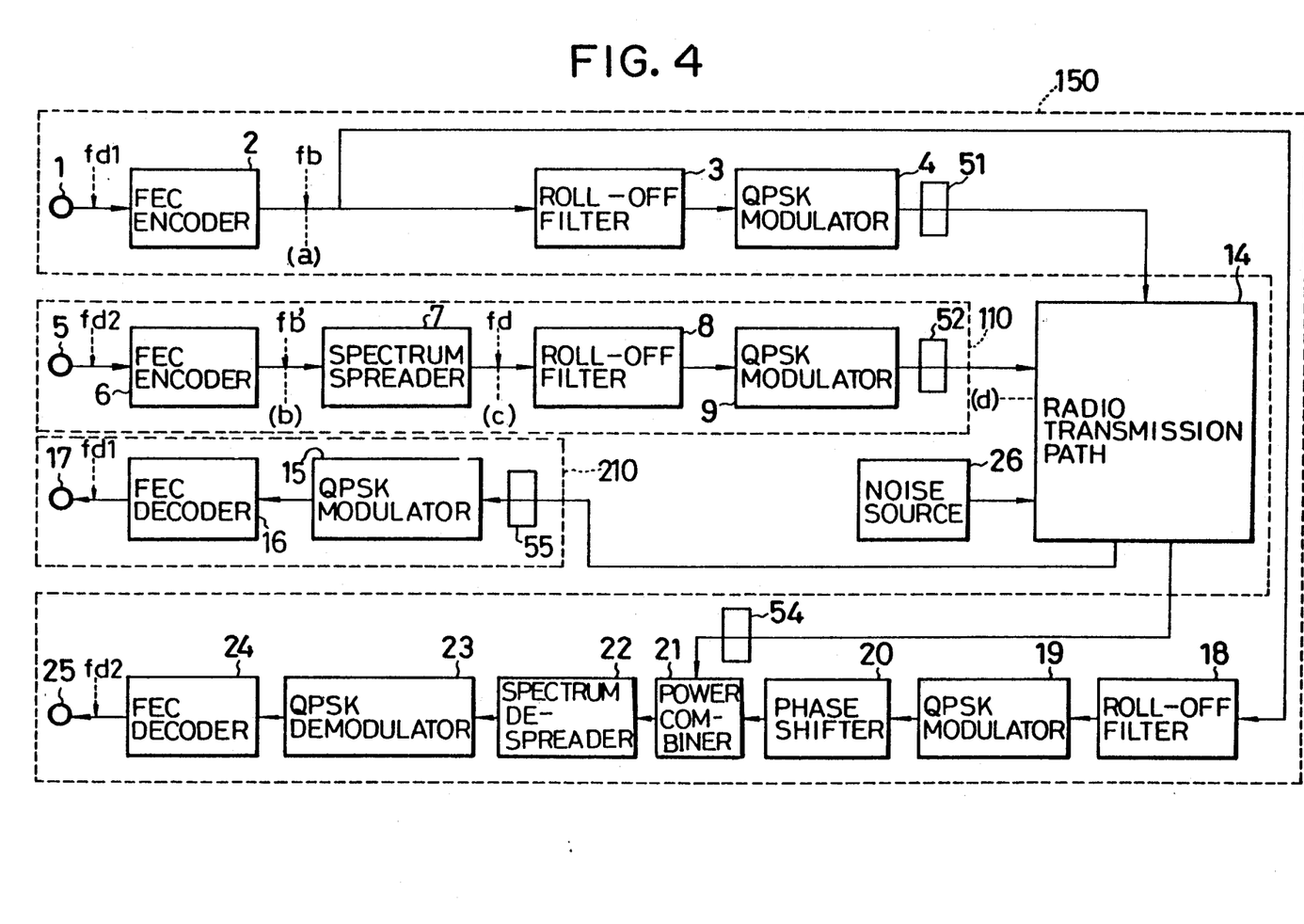
FIG. 4 is a block diagram of an alternative configuration for the digital communication system shown in FIG. 1.

It is also to be noted that, for a case in which the transmitting station receives a backward low speed digital signals such as an answer-back voice signals from the receiving station while transmitting the high speed signals such as video signals to the receiving station, the configuration of a digital communication system of FIG. 1 as described above may be modified as shown in FIG. 4. This alternative configuration shown in FIG. 4 differs from the configuration of FIG. 1 in that the high speed signal transmitting part and the low speed signal receiving part are commonly included in a transmitting station 150, in which the input of the roll-off filter 18 is provided by the output of the FEC encoder 2, instead of the output of the QPSK demodulator 15, and the SSMA-QPSK signals transmitted from the low speed signal transmitting station 110 through the transmission path 14 are received by a transmitting station receiver device 54 provided at the transmitting station 150 while the high speed QPSK signals transmitted from the transmitting station 150 are received by a receiver device 55 provided at a receiving station 210.

Referring now to FIG. 5 to FIG. 8, the result of the experiment conducted by using the digital communication system of FIG. 1 will be described. In the following, the reason why it is possible to increase a number of channels for the low speed digital signals in this digital communication system will be fully explained in a course of analyzing the result of the experiment. In addition, the reason why it is possible to realize the transmission of the high speed digital signals and the low speed digital signals at the appropriate bit error rates for respective signals in this digital communication system will also be fully explained in a course of analyzing the result of the experiment.

As already mentioned above, the experiment was conducted by using the noise source 26 shown in FIG. 1 for power combining a variable amount of noise to the radio transmission path 14, for the purpose of realizing the realistic transmission condition.

The other conditions used in the experiment are as follows.

The speed fd1 of the input high speed digital signals entered at the input terminal 1 was fd1=10.752 Mbit/sec.

The roll-off rate $\alpha$ of the roll-off filters 3, 8, and 18 was $\alpha=0.4$.

The FEC encoding used by the FEC encoder 2 was the convolutional encoding with the encoding rate $R=\frac{1}{2}$, and the constraint length K=7, and the FEC decoding used by the FEC decoder 16 was the 3 bit soft decision Viterbi decoding.

The speed fd2 of the input low speed digital signals entered at the input terminal 5 was fd2=6.4 Kbit/sec.

The spectrum spreading used by the spectrum spreader 7 and the spectrum despreader 22 was the direct sequence type with the spectrum spreading code speed of fss=6.144 Mbit/sec.

The FEC encoding used by the FEC encoder 6 was the convolutional encoding with the encoding rate $R=\frac{1}{2}$, and the constraint length K=7, and the FEC decoding used by the FEC decoder 24 was the 3 bit soft decision Viterbi decoding.

The result of this experiment is summarized in the graphs of FIG. 5 to FIG. 8, which will now be analyzed in detail.

Figure 5:
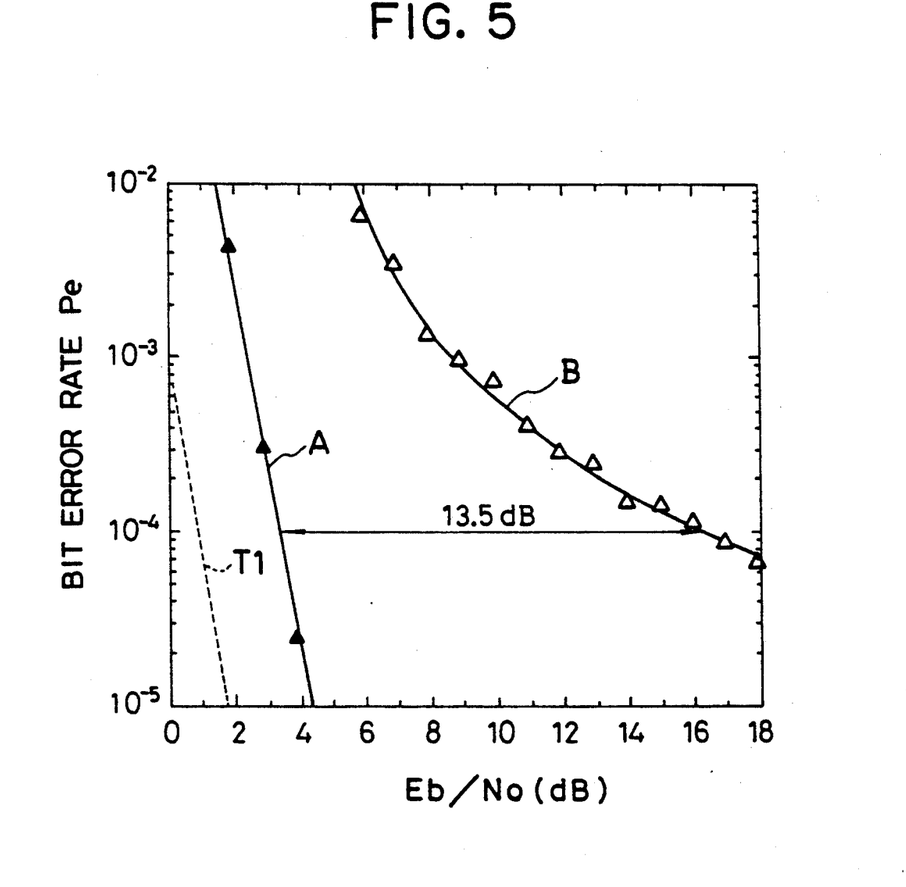
FIG. 5 is a graph of a bit error rate versus a signal to noise power ratio for the low speed digital signals obtained by an experiment using the digital communication system of FIG. 1.

FIG. 5 shows the bit error rate Pe for the low speed digital signals transmitted between the input terminal 5 and the output terminal 25, as a function of the signal to noise power ratio Eb/No, which was measured by varying the amount of noise combined from the noise source 26.

In FIG. 5, a curve A indicates the result of this experiment using the digital communication system of the embodiment described above for a case of transmitting two channels of the low speed digital signals with the D/U ratio of the high speed digital signals with respect to the low speed digital signals equal to 25 dB. For a comparison, FIG. 5 also shows a curve B which indicates a comparative result for a case of transmitting two channels of the low speed digital signals with the D/U ratio of the high speed digital signals with respect to the low speed digital signals equal to 25 dB, by using only the FEC without the cancellation of the high speed digital signals using the replica. In addition, as a reference, FIG. 5 also shows a curve T1 which indicates a theoretical value for a case of transmitting only one channel of the low speed digital signals by using only the FEC without spectrum spreading.

By comparing the curves A and B shown in FIG. 5, it can be seen that, in order to achieve the bit error rate of $Pe=10^{-4}$, the Eb/No degradation from the theoretical value indicated by the curve T1 is approximately 2.5 dB for the curve A while it is approximately 16 dB for the curve B, so that the Eb/No degradation necessary to achieve the bit error rate of $Pe=10^{-4}$ can be reduced by approximately 13.5 dB in the digital communication system of the embodiment described above.

Figure 6:
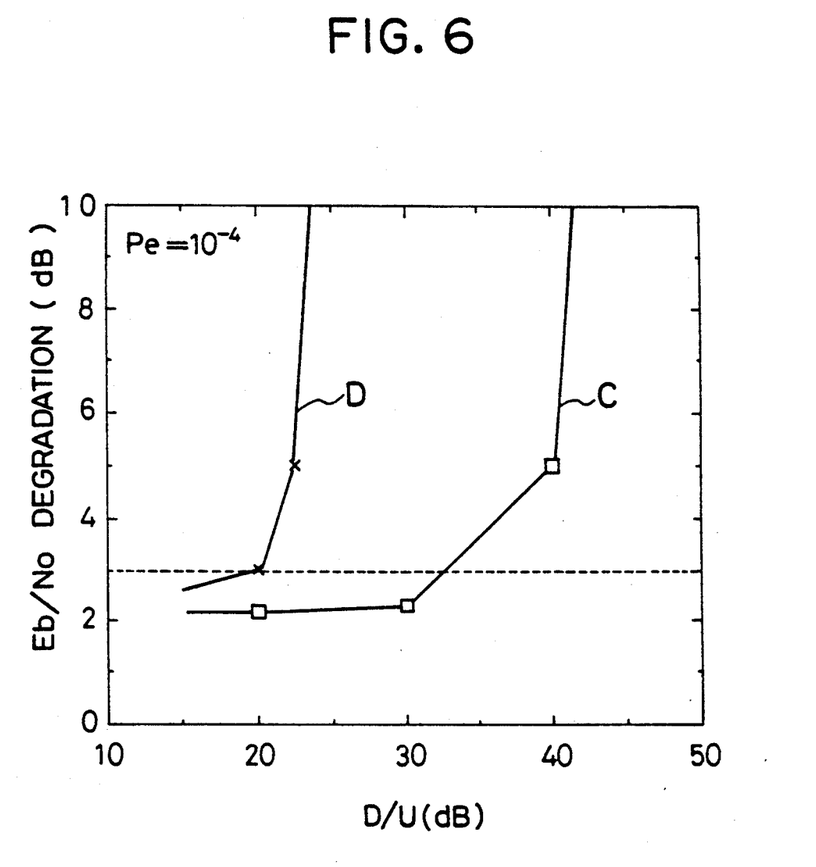
FIG. 6 is a graph of a signal to noise power ratio degradation versus a desired to undesired signal power ratio for the low speed digital signals obtained by the same experiment using the digital communication system of FIG. 1 as that of FIG. 5.

Next, FIG. 6 shows the Eb/No degradation from the theoretical value indicated by the curve T1 shown in FIG. 5 necessary to achieve the bit error rate of $Pe=10^{-4}$, as a function of the D/U ratio of the high speed digital signals with respect to the low speed digital signals.

In FIG. 6, a curve C indicates the result of this experiment using the digital communication system of the embodiment described above for a case of transmitting two channels of the low speed digital signals. For a comparison, FIG. 6 also shows a curve D which indicates a comparative result for a case of transmitting two channels of the low speed digital signals by using only the FEC without the cancellation of the high speed digital signals using the replica.

By comparing the curves C and D shown in FIG. 6, it can be seen that, for a practically tolerable Eb/No degradation of 3.0 dB in a case of realizing the bit error rate of $Pe=10^{-4}$, the D/U ratio can take a value up to approximately 30 dB for the curve C while it is only up to approximately 20 dB for the curve D, so that the D/U ratio available in a case of achieving the bit error rate of $Pe=10^{-4}$ with the Eb/No degradation from the theoretical value equal to 3.0 dB can be increased by approximately 10 dB in the digital communication system of the embodiment described above.

Figure 7:
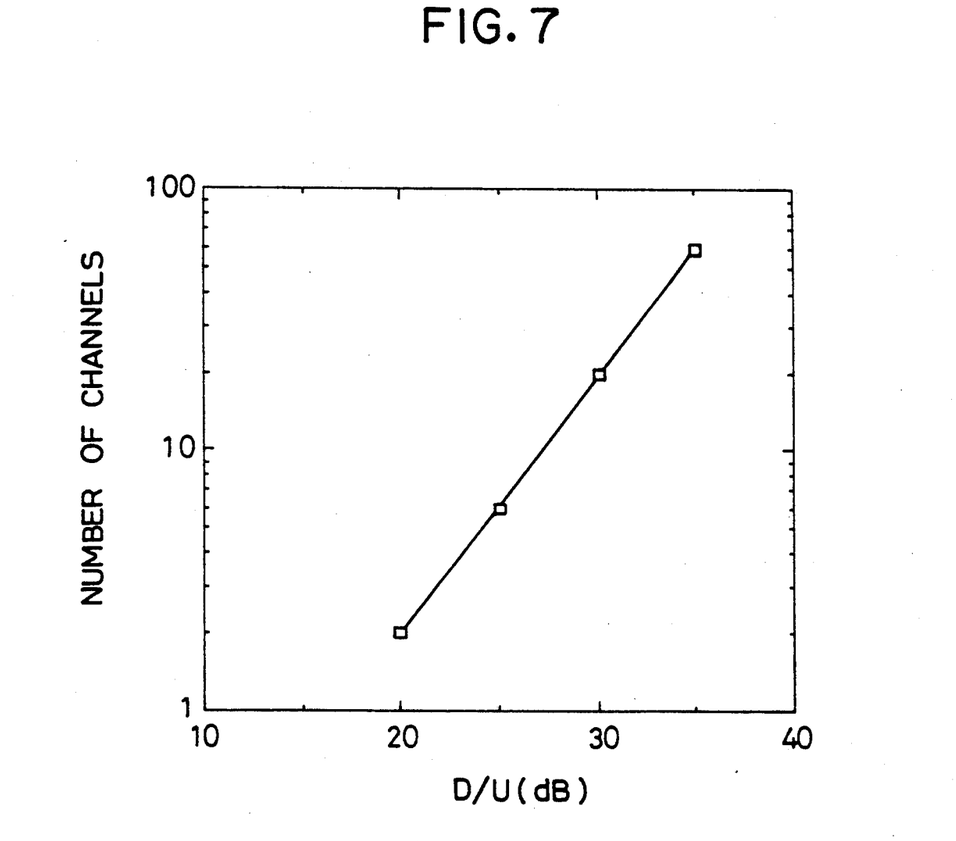
FIG. 7 is a graph of an available number of channels versus a desired to undesired signal power ratio for the low speed digital signals obtained by the same experiment using the digital communication system of FIG. 1 as that of FIG. 5.

Next, FIG. 7 shows the number of channels available for the low speed digital signals, for a constant total transmission power for the low speed digital signals equal to that required in a case of transmitting two channels of the low speed digital signals with the D/U ratio equal to 20 dB, as a function of the D/U ratio. As shown in FIG. 7, when the larger D/U ratio is used, the necessary transmission power for the low speed digital signals per channel becomes smaller, so that the number of channels available for the low speed digital signals can be increased for the same total transmission power. In a case of the digital communication system of the embodiment described above, the D/U ratio available in a case of achieving the bit error rate of Pe=$10^{-4}$ with the Eb/No degradation from the theoretical value equal to 3.0 dB can be increased by approximately 10 dB, up to approximately 30 dB, as shown in FIG. 6 described above, so that the number of channels available for the low speed digital signals can be increased ten times, up to approximately 20 channels.

Figure 8:
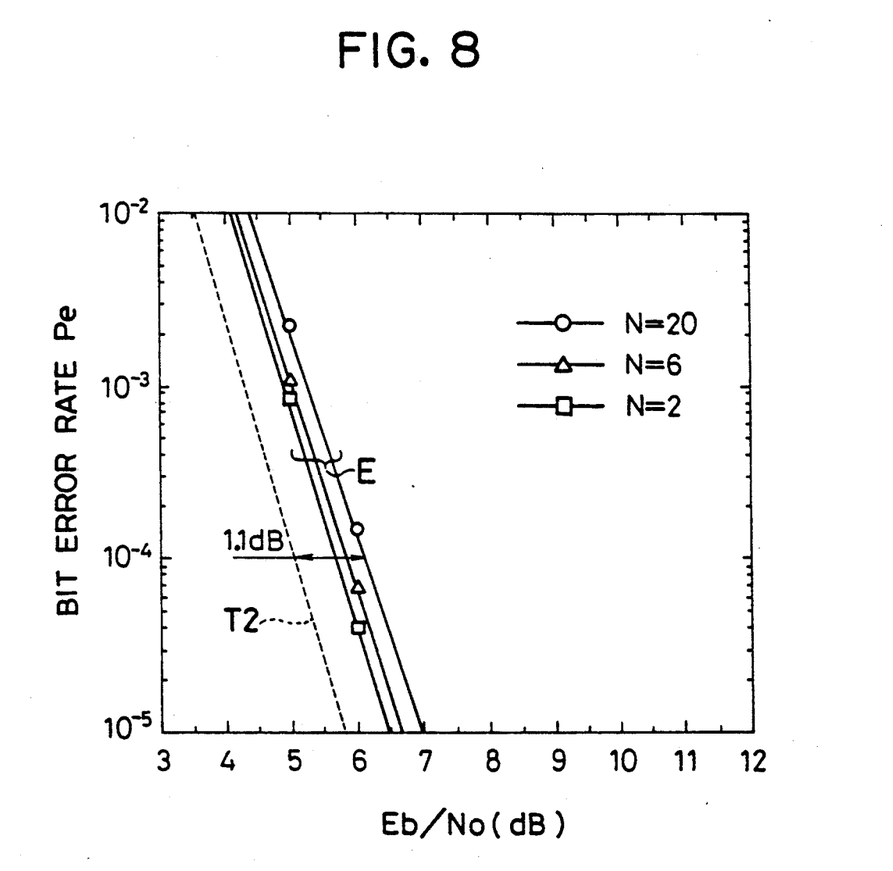
FIG. 8 is a graph of a bit error rate versus a signal to noise power ratio for the high speed digital signals obtained by the same experiment using the digital communication system of FIG. 1 as that of FIG. 5.

Lastly, FIG. 8 shows the bit error rate Pe for the high speed digital signals transmitted between the input terminal 1 and the output terminal 17, as a function of the signal to noise power ratio Eb/No, which was measured by varying the amount of noise combined from the noise source 26.

In FIG. 8, a curve E indicates the result of this experiment using the digital communication system of the embodiment described above for three cases of using the number of channels N of the low speed digital signals equal to 2, 6, and 20. As a reference, FIG. 8 also shows a curve T2 which indicates a theoretical value for a case without spectrum spreading which only uses the FEC for the high speed digital signals. From these curves E and T2, it can be seen that the Eb/No degradation from the theoretical value indicated by the curve T2 for a case of achieving the bit error rate of Pe=$10^{-4}$ is only approximately 1.0 dB for all three cases shown in FIG. 8, including the case of N=20. Thus, it can be seen that the practically reasonable bit error rate performance can be achieved in the digital communication system of the embodiment described above even when 20 channels of the low speed digital signals are used.

As described, according to the present invention, the high speed digital signals are cancelled out in obtaining the output low speed digital signals by using the replica of the high speed digital signals, so that it becomes possible to increase a number of channels for the low speed digital signals, while achieving the practically reasonable bit error rate performances for both the high speed digital signals and the low speed digital signals.

This digital communication system according to the present invention will be particularly effective as a satellite video communication system which fully uses digital satellite transmissions for all the signal transmissions involved, because it becomes possible to economize a practical implementation of the satellite video communication system by improving the flexibility in setting up of a new small earth station.

It is to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method of superposed transmission of high and low speed digital signals in a digital communication system, comprising the steps of:
   (a1) forward error correction encoding high speed digital signals to be transmitted to obtain encoded high speed digital signals;
   (a2) modulating a first carrier in a first frequency with the encoded high speed digital signals obtained at the step (a1) to obtain modulated high speed signals;
   (b1) forward error correction encoding low speed digital signals to be transmitted to obtain encoded low speed digital signals;
   (b2) spreading a spectrum of the encoded low speed digital signals obtained at the step (b1) to obtain spread spectrum signals;
   (b3) modulating a second carrier in a second frequency with the spread spectrum signals obtained at the step (b2) to obtain modulated spread spectrum signals;
   (c) transmitting the modulated high speed signals obtained at the step (a2) and the modulated spread spectrum signals obtained at the step (b3) through an identical frequency band on a transmission path in a form of superposed transmission signals;
   (d1) demodulating the modulated high speed signals in the superposed transmission signals transmitted through the transmission path at the step (c) to reproduce the encoded high speed digital signals;
   (d2) forward error correction decoding the encoded high speed digital signals reproduced at the step (d1) to reproduce the high speed digital signals;
   (e1) obtaining a phase inverted replica of the modulated high speed signals in the superposed transmission signals transmitted through the transmission path at the step (c) according to the high speed digital signals reproduced at the step (d2);
   (e2) power combining the superposed transmission signals transmitted through the transmission path at the step (c) with the phase inverted replica obtained at the step (e1) to obtain modulated spread spectrum signals in the superposed transmission signals;
   (f1) despreading a spectrum of the modulated spread spectrum signals obtained at the step (e2) to obtain modulated low speed signals;
   (f2) demodulating the modulated low speed signals obtained at the step (f1) to reproduce the encoded low speed digital signals; and
   (f3) forward error correction decoding the encoded low speed digital signals reproduced at the step (f2) to reproduce the low speed digital signals.

2. The method of claim 1, wherein at the step (a2), the first carrier in the first frequency is modulated by any one of a QPSK (Quadrature Phase Shift Keying) modulation and a BPSK (Binary Phase Shift Keying) modulation.

3. The method of claim 1, wherein at the step (a1) and (d2), the forward error correction encoding and decoding use any one of convolutional codes, Reed-Solomon codes, and BCH codes.

4. The method of claim 1, wherein at the steps (b2) and (f1), the spectrum is spread and despread by spectrum spreading and despreading, respectively, in any one of a direct sequence type using spectrum spreading codes and a frequency hopping type.

5. The method of claim 1, wherein at the step (b1) and (f3), the forward error correction encoding and decoding use any one of convolutional codes, Reed-Solomon codes, and BCH codes.

6. The method of claim 1, wherein at the step (b3), the second carrier in the second frequency is modulated by any one of a QPSK (Quadrature Phase Shift Keying) modulation and a BPSK (Binary Phase Shift Keying) modulation.

7. The method of claim 1, wherein at the step (d1), the modulated high speed signals are demodulated by using any one of a coherent detection and a differential detection.

8. The method of claim 1, wherein the step (e1) further comprises the steps of:

(e11) modulating the second carrier in the second frequency with the high speed digital signals reproduced at the step (d2) to obtain a replica of the modulated high speed signals in the superposed transmission signals transmitted through the transmission path at the step (c); and (e12) inverting a phase of the replica obtained at the step (e11) to obtain the phase inverted replica of the modulated high speed signals in the superposed transmission signals transmitted through the transmission path at the step (c).

9. The method of claim 1, wherein at the step (f1), the second carrier in the second frequency is modulated by any one of a QPSK (Quadrature Phase Shift Keying) modulation and a BPSK (Binary Phase Shift Keying) modulation.

10. The method of claim 1, wherein at the step (f2), the modulated low speed signals are demodulated by using any one of a coherent detection and a differential detection.

11. A digital communication system using superposed transmission of high and low speed digital signals, comprising:

receiver means for receiving modulate high speed signals and modulated spread spectrum signals through an identical frequency band on a transmission path in a form of superposed transmission signals;

first demodulator means for demodulating the modulated high speed signals in the superposed transmission signals transmitted through the transmission path and received by the receiver means to obtain encoded high speed digital signals;

first decoder means for forward error correction decoding the encoded high speed digital signals obtained by the first demodulator means to obtain high speed digital signals;

replica generation means for obtaining a phase inverted replica of the modulated high speed signals in the superposed transmission signals transmitted through the transmission path and received by the receiver means according to the high speed digital signals obtained by the first decoder means;

power combiner means for power combining the superposed transmission signals transmitted through the transmission path and received by the receiver means with the phase inverted replica obtained by the replica generation means to obtain modulated spread spectrum signals in the superposed transmission signals;

spectrum despreader means for despreading a spectrum of the modulated spread spectrum signals obtained by the power combiner means to obtain modulated low speed signals;

second demodulator means for demodulating the modulated low speed signals obtained by the spectrum despreader means to obtain encoded low speed digital signals; and second decoder means for forward error correction decoding the encoded low speed digital signals obtained by the second demodulator means to obtain low speed digital signals.

12. The digital communication system of claim 11, further comprising:

first encoder means for forward error correction encoding the high speed digital signals to obtain the encoded high speed digital signals;

first modulator means for modulating a first carrier in a first frequency with the encoded high speed digital signals obtained by the first encoder means to obtain the modulated high speed signals to be transmitted through the transmission path;

second encoder means for forward error correction encoding the low speed digital signals to obtain the encoded low speed digital signals;

spectrum spreader means for spreading a spectrum of the encoded low speed digital signals obtained by the second encoder means to obtain spread spectrum signals;

second modulator means for modulating a second carrier in a second frequency with the spread spectrum signals obtained by the spectrum spreader means to obtain the modulated spread spectrum signals to be transmitted through the transmission path; and transmitter means for transmitting the modulated high speed signals obtained by the first modulator means and the modulated spread spectrum signals obtained by the second modulator means through an identical frequency band on the transmission path in a form of superposed transmission signals.

13. The digital communication system of claim 12, wherein the first modulator means modulates the first carrier in the first frequency by any one of a QPSK (Quadrature Phase Shift Keying) modulation and a BPSK (Binary Phase Shift Keying) modulation.

14. The digital communication system of claim 12, wherein the first encoder means and the first decoder means use the forward error correction encoding and decoding, respectively, using any one of convolutional codes, Reed-Solomon codes, and BCH codes.

15. The digital communication system of claim 12, wherein the spectrum spreader means and the spectrum despreader means use spectrum spreading and despreading, respectively, in any one of a direct sequence type using spectrum spreading codes and a frequency hopping type.

16. The digital communication system of claim 12, wherein the second encoder means and second decoder means use the forward error correction encoding and decoding, respectively, using any one of convolutional codes, Reed-Solomon codes, and BCH codes.

17. The digital communication system of claim 12, wherein the second modulator means modulates the second carrier in the second frequency by any one of a QPSK (Quadrature Phase Shift Keying) modulation and a BPSK (Binary Phase Shift Keying) modulation.

18. The digital communication system of claim 11, wherein the first demodulator means demodulates the modulated high speed signals by using any one of a coherent detection and a differential detection.

19. The digital communication system of claim 11, wherein the replica generation means further comprises:

modulator means for modulating the second carrier in the second frequency with the high speed digital signals obtained by the first decoder means to obtain a replica of the modulated high speed signals in the superposed transmission signals transmitted through the transmission path and received by the receiver means; and phase shifter means for inverting a phase of the replica obtained by the modulator means to obtain the phase inverted replica of the modulated high speed signals in the superposed transmission signals transmitted through the transmission path and received by the receiver means.

20. The digital communication system of claim 19, wherein the modulator means modulates the second carrier in the second frequency by any one of a QPSK (Quadrature Phase Shift Keying) modulation and a BPSK (Binary Phase Shift Keying) modulation.

21. The digital communication system of claim 11, wherein the second demodulator means demodulates the modulated low speed signals by using any one of a coherent detection and a differential detection.

22. An apparatus for superposed transmission of high and low speed digital signals, comprising:
first encoder means for forward error correction encoding high speed digital signals to be transmitted to obtain encoded high speed digital signals;
first modulator means for modulating a first carrier in a first frequency with the encoded high speed digital signals obtained by the first encoder means to obtain modulated high speed signals to be transmitted through a transmission path;
second encoder means for forward error correction encoding low speed digital signals to be transmitted to obtain encoded low speed digital signals;
spectrum spreader means for spreading a spectrum of the encoded low speed digital signals obtained by the second encoder means to obtain spread spectrum signals;
second modulator means for modulating a second carrier in a second frequency with the spread spectrum signals obtained by the spectrum spreader means to obtain modulated spread spectrum signals to be transmitted through the transmission path; and
transmitter means for transmitting the modulated high speed signals obtained by the first modulator means and the modulated spread spectrum signals obtained by the second modulator means through an identical frequency band on the transmission path in a form of superposed transmission signals.

23. The apparatus of claim 22, wherein the first modulator means modulates the first carrier in the first frequency by any one of a QPSK (Quadrature Phase Shift Keying) modulation and a BPSK (Binary Phase Shift Keying) modulation.

24. The apparatus of claim 22, wherein the first encoder means uses the forward error correction encoding using any one of convolutional codes, Reed-Solomon codes, and BCH codes.

25. The apparatus of claim 22, wherein the spectrum spreader means uses spectrum spreading in any one of a direct sequence type using spectrum spreading codes and a frequency hopping type.

26. The apparatus of claim 22, wherein the second encoder means uses the forward error correction encoding using any one of convolutional codes, Reed-Solomon codes, and BCH codes.

27. The apparatus of claim 22, wherein the second modulator means modulates the second carrier in the second frequency by any one of a QPSK (Quadrature Phase Shift Keying) modulation and a BPSK (Binary Phase Shift Keying) modulation.

* * * * *